(12) United States Patent
Wisdom et al.

(10) Patent No.: US 11,580,497 B2
(45) Date of Patent: *Feb. 14, 2023

(54) NETWORK SECURITY TOOL

(71) Applicant: The Prudential Insurance Company of America, Newark, NJ (US)

(72) Inventors: Andrew M. Wisdom, Mountain Top, PA (US); David A. Casto, Mountain Top, PA (US)

(73) Assignee: THE PRUDENTIAL INSURANCE COMPANY OF AMERICA, Newark, NJ (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/235,622

(22) Filed: Apr. 20, 2021

(65) Prior Publication Data

US 2021/0241229 A1 Aug. 5, 2021

Related U.S. Application Data

(63) Continuation of application No. 15/188,399, filed on Jun. 21, 2016, now Pat. No. 11,010,717.

(51) Int. Cl.
| | |
|---|---|
| *H04L 9/40* | (2022.01) |
| *G06Q 40/08* | (2012.01) |
| *G06Q 10/06* | (2012.01) |
| *G06F 21/57* | (2013.01) |
| *G06Q 10/10* | (2012.01) |
| *H04L 67/50* | (2022.01) |
| *G06Q 10/0635* | (2023.01) |

(52) U.S. Cl.
CPC .......... *G06Q 10/10* (2013.01); *G06F 21/577* (2013.01); *G06Q 10/0635* (2013.01); *G06Q 40/08* (2013.01); *H04L 63/14* (2013.01); *H04L 63/1433* (2013.01); *H04L 67/535* (2022.05)

(58) Field of Classification Search
CPC .... G06Q 10/10; G06Q 10/06; G06Q 10/0635; G06Q 10/063; G06Q 40/08; H04L 63/1433; H04L 63/102; G06F 21/577; G06F 21/552; G06F 21/57; G06F 2221/2101

See application file for complete search history.

(56) References Cited

U.S. PATENT DOCUMENTS

| | | |
|---|---|---|
| 6,374,358 B1 | 4/2002 | Townsend |
| 6,782,421 B1 | 8/2004 | Soles |
| 6,925,443 B1 | 8/2005 | Baggett, Jr. |
| 7,392,203 B2 | 6/2008 | Edison |
| 8,201,256 B2 | 6/2012 | Patanella |

(Continued)

*Primary Examiner* — Michael Simitoski
(74) *Attorney, Agent, or Firm* — Baker Botts, LLP

(57) ABSTRACT

A system includes a memory, a survey engine, and a reporting engine. The memory stores identifying information of a plurality of users. The survey engine determines a question to present to each user of the plurality of users and determines an interval for each user of the plurality of users. The determined interval for a first user of the plurality of users is different from the determined interval for a second user of the plurality of users. For each user, the survey engine communicates to that user, based on the stored identifying information, the determined question for that user according to the determined interval for that user and receives a response from each user of the plurality of users. The reporting engine generates a report based on the received response from the plurality of users.

20 Claims, 3 Drawing Sheets

(56) References Cited

U.S. PATENT DOCUMENTS

| | | |
|---|---|---|
| 8,412,556 B2 | 4/2013 | Wotzel |
| 8,818,837 B2 | 8/2014 | McCalmont |
| 9,009,829 B2 | 4/2015 | Stolfo |
| 9,507,940 B2 | 11/2016 | Greene |
| 9,674,210 B1 | 6/2017 | Oprea |
| 9,881,271 B2 | 1/2018 | Chapman |
| 9,912,686 B2 | 3/2018 | Mahabir |
| 2002/0104014 A1 | 8/2002 | Zobel |
| 2003/0126049 A1 | 7/2003 | Nagan |
| 2003/0212779 A1 | 11/2003 | Boyter |
| 2003/0212909 A1 | 11/2003 | Chandrashekhar |
| 2004/0010709 A1 | 1/2004 | Baudoin |
| 2004/0193907 A1 | 9/2004 | Patanella |
| 2005/0166259 A1 | 7/2005 | Neupart |
| 2005/0248457 A1 | 11/2005 | Himberger |
| 2005/0288968 A1 | 12/2005 | Collins |
| 2006/0089861 A1 | 4/2006 | King |
| 2006/0101520 A1 | 5/2006 | Schumaker |
| 2006/0117388 A1 | 6/2006 | Nelson |
| 2007/0047016 A1 | 3/2007 | Borders et al. |
| 2007/0180490 A1 | 8/2007 | Renzi |
| 2008/0047017 A1 | 2/2008 | Renaud |
| 2009/0157483 A1 | 6/2009 | Otto |
| 2010/0269175 A1 | 10/2010 | Stolfo |
| 2011/0061089 A1 | 3/2011 | O'Sullivan |
| 2014/0199663 A1 | 7/2014 | Sadeh-Koniecpol |
| 2016/0269908 A1 | 9/2016 | Richards |
| 2017/0244740 A1 | 8/2017 | Mahabir |

NETWORK SECURITY TOOL

CROSS-REFERENCE TO RELATED APPLICATION

This application is a continuation of U.S. patent application Ser. No. 15/188,399 filed Jun. 21, 2016 entitled "Tool for Improving Network Security."

TECHNICAL FIELD

This disclosure relates generally to maintaining network security.

BACKGROUND

The security of a network may be threatened in various ways. For example, the network may be exposed to malware, viruses, malicious intrusions, hacks, etc. which may threaten the security of the network and the security of other nodes on the network. Therefore, maintaining the security of a network is important to the functioning of the network.

SUMMARY OF THE DISCLOSURE

According to an embodiment, a system includes a memory, a survey engine, and a reporting engine. The memory stores identifying information of a plurality of users. The survey engine determines a question to present to each user of the plurality of users and determines an interval for each user of the plurality of users. The determined interval for a first user of the plurality of users is different from the determined interval for a second user of the plurality of users. For each user, the survey engine communicates to that user, based on the stored identifying information, the determined question for that user according to the determined interval for that user and receives a response from each user of the plurality of users. The reporting engine generates a report based on the received response from the plurality of users.

According to another embodiment, a method includes storing identifying information of a plurality of users and determining a question to present to each user of the plurality of users. The method also includes determining an interval for each user of the plurality of users. The determined interval for a first user of the plurality of users is different from the determined interval for a second user of the plurality of users. The method further includes, for each user, communicating to that user, based on the stored identifying information, the determined question for that user according to the determined interval for that user and receiving a response from each user of the plurality of users. The method also includes generating a report based on the received response from the plurality of users.

According to yet another embodiment, an apparatus includes a survey engine and a reporting engine. The survey engine determine a question to present to each user of the plurality of users and determines an interval for each user of the plurality of users. The determined interval for a first user of the plurality of users is different from the determined interval for a second user of the plurality of users. For each user, the survey engine communicates to that user the determined question for that user according to the determined interval for that user and receives a response from each user of the plurality of users. The reporting engine generates a report based on the received response from the plurality of users.

Certain embodiments provide one or more technical advantages. For example, an embodiment improves the security of a network by surveying users on the network at determined intervals to determine threats or risks to network security. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
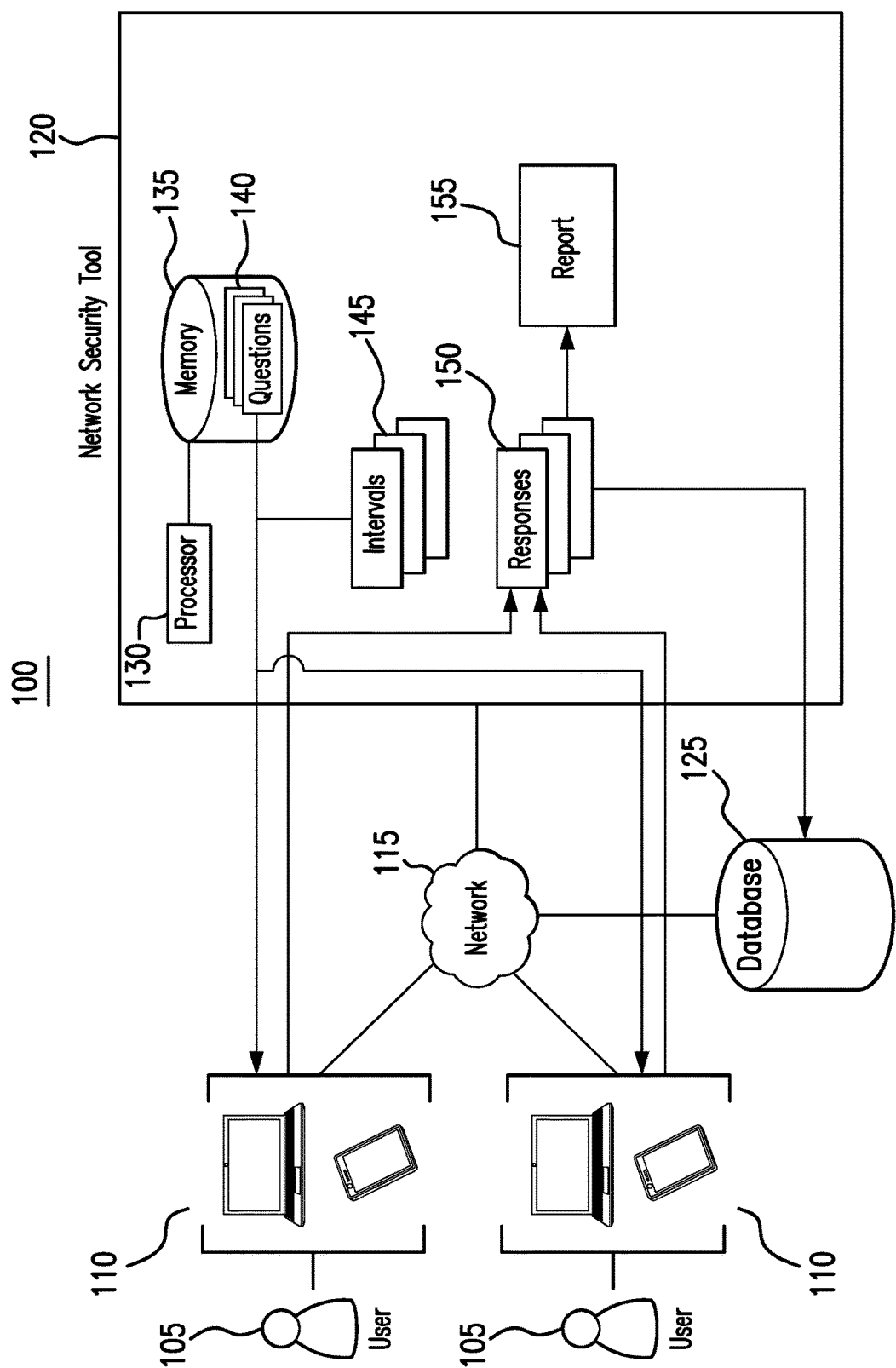
FIG. 1 illustrates a system for analyzing network security.
Figure 2:
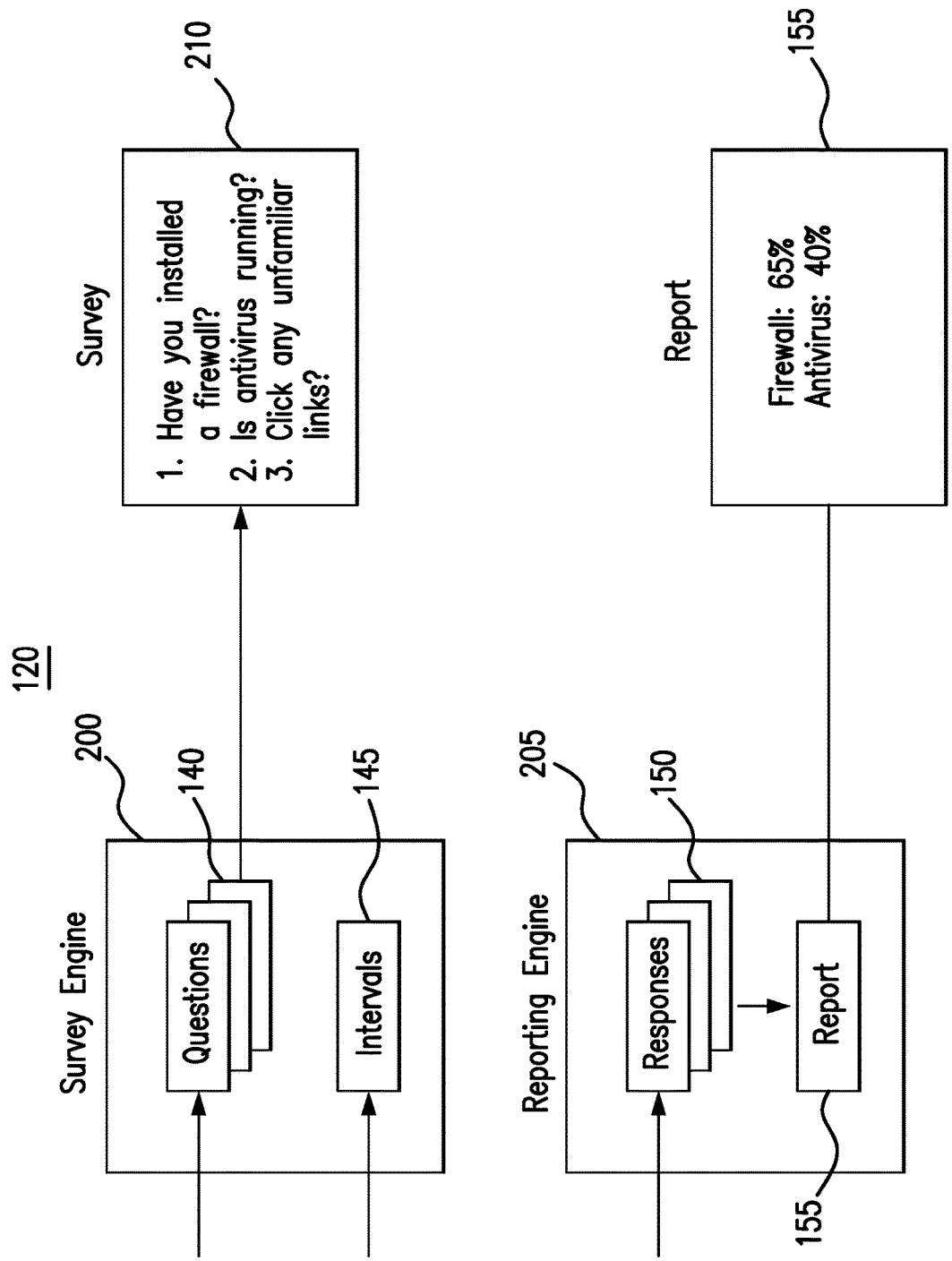
FIG. 2 illustrates the network security tool of the system of FIG. 1.
Figure 3:
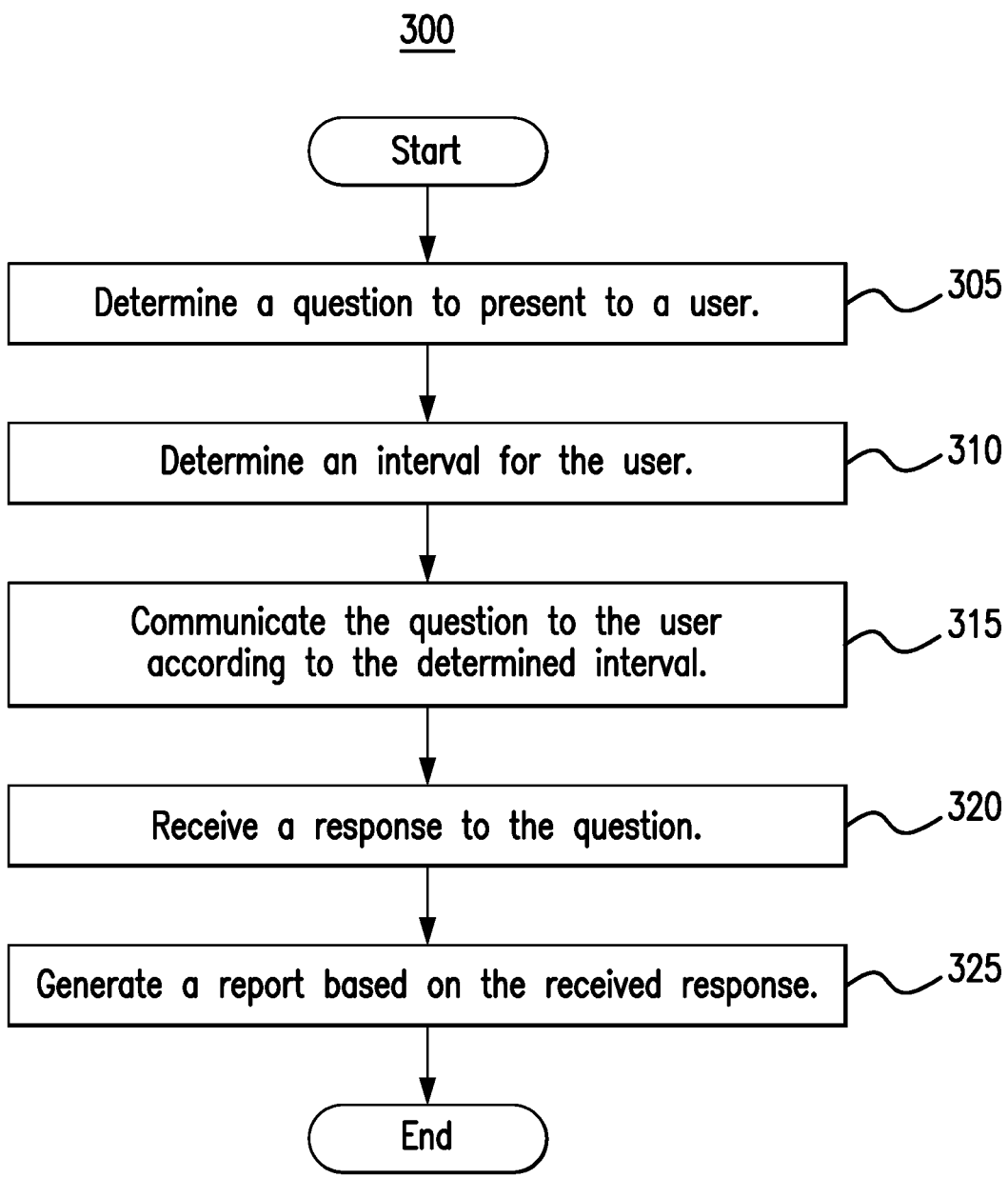
FIG. 3 is a flowchart illustrating a method for analyzing network security using the system of FIG. 1.

Embodiments of the present disclosure and its advantages are best understood by referring to FIGS. 1 through 3 of the drawings, like numerals being used for like and corresponding parts of the various drawings.

The security of a network may be threatened in various ways. For example, the network may be exposed to malware, viruses, malicious intrusions, hacks and so on. Each of these exposures may threaten the security of the network and the security of other nodes on the network. In many instances, preventing exposure to malware, viruses, malicious intrusions and hacks is the best way to maintain network security. Once the network has been exposed to any of these issues, the security of the network and the security of users and devices on the network may be permanently compromised.

Many of these threats are introduced by users on the network. For example, malware and viruses may be introduced by users on the network who do not have sufficient firewalls and/or antiviruses set up on their devices. As another example, a user may expose the network and other devices on the network to malicious intrusions and hacks by visiting unfamiliar websites and/or clicking unfamiliar links. Therefore, monitoring and assessing the activities of users on the network is important to maintaining and/or improving the security of the network.

As the number of users on the network increases and as the devices on the network become increasingly mobile, it becomes more difficult to assess the activities of users on the network. For example, a user may use a device on multiple networks. If the device is compromised while connected to one network, the device may compromise other devices and other networks when that device connects to other networks. As another example, a user may have implemented a firewall and/or an antivirus when connecting to a network but the user may deactivate the firewall and/or the antivirus while connected to the network thus exposing the network to security threats.

This disclosure contemplates a network security tool that assesses user activity on the network to determine whether the users are posing a security threat to the network. The network security tool surveys the users at predefined intervals. Each survey asks the users questions related to their activities with regards to network security. The users' responses are recorded and then reported for further analysis. In certain embodiments, the network security tool improves the security of the network by assessing a user's activities at predefined intervals. In some embodiments, the network security tool improves the security of a network by aggregating responses to predetermined questions that are presented to a user. The network security tool will be described in more detail using FIGS. 1 through 3. FIG. 1 describe the network security tool generally. FIGS. 2 and 3 will describe the network security tool in more detail.

FIG. 1 illustrates a system 100 for analyzing network security. As illustrated in FIG. 1, system 100 includes devices 110, network 115, network security tool 120, and database 125. In particular embodiments, system 100 improves the security of network 115 by periodically surveying users 105 as to the user's network activity.

Devices 110 may be any device that can communicate with other components of system 100. Users 105 may use devices 110 to perform any activity over network 115. Devices 110 may receive surveys that ask the users questions pertaining to their activity on network 115. The users may respond to the surveys so that security risks and/or threats may be assessed. The surveys may be presented to users 105 at periodic intervals that minimize interference with the user's 105 activities. For example, the surveys may be presented in a small popup window on device 110.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Network security tool 120 constructs surveys for devices 110 and sends those surveys to devices 110 at periodic intervals. As illustrated in FIG. 1, network security tool 120 includes a processor 130 and a memory 135. This disclosure contemplates processor 130 and memory 135 being configured to perform any of the operations of network security tool 120 described herein.

Processor 130 is any electronic circuitry, including, but not limited to microprocessors, application specific integrated circuits (ASIC), application specific instruction set processor (ASIP), and/or state machines, that communicatively couples to memory 135 and controls the operation of network security tool 120. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of job hold tool 120 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein.

Network security tool 120 stores a plurality of questions 140 that can be used to construct a survey. Each question 140 may pertain to a different aspect of network security. For example, one question may inquire whether a firewall has been implemented on a device 110. As another example, a question 140 may inquire whether an antivirus has been implemented on device 110. As yet another example, a question 140 may inquire whether any unfamiliar websites have been visited on device 110. This disclosure contemplates questions 140 inquiring about any appropriate subject matter.

Network security tool 120 may also store a plurality of intervals 145. Each interval 145 may be predefined for a particular device 110 or user 105. In some instances, an interval 145 is a random time interval. In other instances, an interval 145 is a set and predefined time interval. Intervals 145 may be defined based on a user's 105 past activities and/or answers to surveys. For example, if a user 105 has a history of exposing network 115 to security threats, then an interval 145 for that user 105 may be short. If a user 105 does not have a history of exposing network 115 to security threats, then the interval 145 for that user may be long and/or random. This disclosure contemplates intervals 145 being determined using any appropriate criteria.

Network security tool 120 may customize surveys for each user 105 of system 100. For example, network security tool 120 may construct surveys that are tailored for a particular user 105. The survey may include questions 140 that are relevant for that user 105. For example, if a user 105 has always implemented a firewall on the user's 105 device 110, then network security tool 120 may decide not to ask user 105 whether a firewall has been implemented on device 110. Instead, network security tool 120 may ask the user whether an antivirus has been implemented on device 110, or network security tool 120 may ask whether user 105 has visited any unfamiliar websites and/or clicked on any unfamiliar links. In this manner, network security tool 120 may present different questions 140 to different users 105. Furthermore, network security tool 120 may send surveys to devices 110 at different time intervals 145. For example, if a user 105 has a history of exposing network 115 to security threats, network security tool 120 may send a survey to user 105 frequently. However, if a user 105 does not have a history of exposing network 115 to security threats, network security tool 120 may send surveys to that user 105 infrequently. In this manner, network security tool 120 may customize surveys for each user with different questions and send these surveys at different time intervals.

Users 105 may respond to surveys using device 110. Device 110 may send the user's responses 150 to network security tool 120. Network security tool 120 may then store these responses 150 in a remote database 125. These responses 150 may then be retrieved and/or analyzed at a later time to assess the security of network 115. For example, network security tool 120 may retrieve responses 150 from remote database 125 and may aggregate responses 150 into a report 155. Report 155 may present statistics and/or information regarding the users 105 of network 115. Report 155 may then be communicated to users 105 to assess the security of network 115. In this manner, the security of network 115 is improved. For example, based on report 155 a user may determine the population of users 105 that have implemented a firewall and/or antivirus and take remedial action. As another example, based on report 155 a user 105 may determine the population of users 105 that have visited unfamiliar websites and take remedial action. The operation of network security tool 120 will be described in more detail using FIGS. 2 and 3.

FIG. 2 illustrates the network security tool 120 of the system 100 of FIG. 1. As illustrated in FIG. 2, network security tool 120 includes a survey engine 200 and a reporting engine 205. In particular embodiments, network security tool 120 improves the security of a network by presenting questions to a user, collecting responses from that user, and aggregating results to assess the security of a network.

Survey engine 200 prepares and communicates survey 210 to various users. Survey engine 200 begins by retrieving a plurality of questions 140. Then survey engine 200 picks certain questions 140 of the plurality of questions 140 to be included in survey 110. Survey engine 200 may pick these questions 140 using any number of criteria. For example, survey engine 200 may pick the questions 140 based on past behavior of a particular user 105. If a user 105 has a history of not implementing a firewall, then survey engine 200 may pick a question 140 that asks, "Have you installed a firewall?" If a user has a history of using devices that are infected by viruses, then survey engine 200 may pick a question 140 that asks, "Is antivirus running?" As yet another example, if a user has a history of visiting malicious websites, survey engine 200 may pick a question 140 that asks, "Click any unfamiliar links?" Survey engine 200 may add the picked questions 140 into survey 210.

Survey engine 200 may determine one or more intervals 145 when survey 210 should be sent to the user. In particular embodiments, survey engine 200 determines the one or more intervals 145 based on any appropriate criteria. For example, survey engine 200 may determine an interval 145 based on a user's past behavior. If a user has a history of posing security threats to a network, then survey engine 200 may determine a shorter interval 145 for that user. As a result, the user may be presented with survey 210 more frequently. If a user does not have a history of posing security threats to a network, survey engine 200 may determine interval 145 to be longer. As a result, the user may be presented with survey 210 less frequently. In some instances, survey engine 200 may determine interval 145 to be a random value. As a result, a user may be presented with survey 210 at differing times throughout a day or throughout a week. In some embodiments, presenting survey 210 to a user may act as a reminder to the user to implement particular safeguards (e.g., a firewall and/or an antivirus).

In particular embodiments, survey engine 200 communications surveys 210 at random intervals. Based on principles of statistics and randomness, collecting data in this fashion allows for a percentage of activities to be directly correlated to a percentage of time. In this way, statistically sound inferences may be made based upon collecting a sampling of data versus needing data for every minute of every day. As a result, the findings can be represented as a percentage of time (in addition to a percentage of survey responses). For example, if a sampling study found that 40% of the time, users answered affirmatively to the question "Is antivirus running?," not only would reporting show that 40% of activity captured showed antivirus was running, one could also deduce that antivirus runs about 40% of the time.

When a user receives survey 210, the user may provide responses to the questions 140 in survey 210. Survey 210 may be presented to a user in a manner that minimally interferes with the user's activities. For example, survey 210 may be presented in a popup window that appears on the display of the user.

An example algorithm for survey engine 210 is as follows: retrieve questions 140; pick a question 140 based on a user's previous activity; add the picked question to survey 210; determine an interval for sending survey 210; communicate survey 210 according to the determined interval 145.

Reporting engine 205 collects responses 150 from a user. Each response 150 may be a response supplied to a question 140 in survey 210. In the illustrated example of FIG. 2, responses 150 may include a collection of "yes" and "no" responses to the questions in survey 210. Reporting engine 205 may generate a report 155 based on the retrieved responses 150. Report 155 may include statistics and information that relate to the security of the network. For example, reporting engine 205 may retrieve responses 150 from a group of users that responded to survey 210. Based on responses 150, reporting engine 205 can determine the percentage of users who have installed a firewall and the percentage of users who are running an antivirus. Reporting engine 205 may include that information in a report 155. Reporting engine 205 may communicate report 155 so that the security of the network may be assessed. For example, a user viewing report 155 may determine that efforts should be increased to encourage other users to run an antivirus while connected to the network. An example algorithm for reporting engine 205 is as follows: wait for responses 150 from users; receive responses 150 from users; aggregate responses 150 into report 155; generate report 155; communicate report 155 to another user.

In certain embodiments, reporting engine 205 may store responses 150 in a remote database. The database may be remote to network security tool 120. By storing responses 150 in the remote database, subsequent analyses may be performed on the stored responses 150.

In the illustrated example of FIG. 2, survey engine 200 has determined that a user should be asked three questions. The three questions are: 1. Have you installed a firewall? 2. Is antivirus running? and 3. Click any unfamiliar links?. Survey engine 200 includes each of these three questions into survey 210. These questions may have been picked because the user has previously exposed the network to threats by getting infected by malware or viruses, possibly through visiting unsafe websites or clicking on unsafe links. Survey engine 200 picks these questions because they are pertinent to previously undesirable behavior by the user that exposed the network to security threats. Survey engine 200 communicates survey 210 to the user based on a determined interval 145. The interval may be short (frequent surveys) or long (infrequent surveys). Survey engine 200 may have determined interval 145 based on previous behavior of the user. For example, if the user has previously exposed the network to threats, the interval may be short so that the user is presented with survey 210 more frequently.

Reporting engine 205 collects responses to survey 210 from the user. For example, the user may have responded with 1. No; 2. Yes; and 3. No. Reporting engine 205 then collects and aggregates responses from several users on the network and generates report 155 that details the responses to surveys 210. For example, report 155 may indicate that 65% of users on the network have implemented a firewall and that 40% of users on the network have implemented an antivirus. Report 155 may be customized to present any information based on responses 150.

FIG. 3 is a flowchart illustrating a method 300 for analyzing network security using the system 100 of FIG. 1. In particular embodiments, network security tool 120 performs method 300. By performing method 300, network security tool 120 improves the security of a network.

Network security tool 120 begins by determining a question to present to a user in step 305. Network security tool 120 then determines an interval for the user in step 310. Network security tool 120 may determine the question and the interval based on previous behavior by the user. For example, if the user has a history of using devices infected by viruses then network security tool 120 may determine a question that should be asked the user is whether the user is running an antivirus. Furthermore, if network security tool 120 determines that the user has a history of exposing the network to threats, then network security tool 120 may determine a short interval for the user.

Network security tool 120 communicates the question to the user according to the determined interval in step 315. The user may then respond to the question and transmit responses back to network security tool 120. Network security tool 120 receives the response to the question in step 320. Then, network security tool 120 generates a report based on the received response in step 325.

Modifications, additions, or omissions may be made to method 300 depicted in FIG. 3. Method 300 may include more, fewer, or other steps. For example, steps may be performed in parallel or in any suitable order. While discussed as network security tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
a memory configured to store identifying information of a first user; and
a hardware processor communicatively coupled to the memory, the hardware processor configured to:
   determine a first question to present to the first user, wherein the determined first question pertains to activity of the first user on a network;
   determine an interval based on previous activity of the first user on the network, wherein:
      the previous activity of the first user on the network does not indicate that the first user has engaged in activities on the network that are classified as undesirable; and
      determining the interval for the first user comprises randomly generating the interval;
   communicate to a device of the first user, based on the stored identifying information of the first user, the first question for the first user according to the determined interval; and
   receive, from the device of the first user, a response to the first question for the first user, wherein the response to the first question for the first user indicates that the first user has engaged in activities on the network that are classified as undesirable;
   determine an adjusted interval for the first user based on the first user's response to the first question, wherein the adjusted interval for the first user is a set interval; and
   subsequently communicate a second question to the device of the first user according to the adjusted interval determined for the first user.

2. The apparatus of claim 1, wherein:
the memory is further configured to store identifying information of a second user; and
the hardware processor is further configured to determine a first question for the second user, wherein the first question for the second user pertains to activity of the second user on the network.

3. The apparatus of claim 2, wherein the first question for the second user is different than the first question for the first user.

4. The apparatus of claim 2, wherein the hardware processor is further configured to:
determine an interval for the second user based on previous activity of the second user on the network, wherein:
   the previous activity of the second user on the network does not indicate that the second user has engaged in activities on the network that are classified as undesirable; and
   determining the interval for the second user comprises randomly generating the interval for the second user;
communicate to a device of the second user, based on the stored identifying information of the second user, the first question for the second user according to the determined interval for the second user; and
receive, from the device of the second user, a response to the first question for the second user, wherein the response to the first question for the second user does not indicate that the second user has engaged in activities on the network that are classified as undesirable;
determine an adjusted interval for the second user based on the second user's response to the first question for the second user, wherein determining the adjusted interval for the second user comprises randomly generating the adjusted interval for the second user; and
subsequently communicate a second question for the second user to the device of the second user according to the adjusted interval determined for the second user.

5. The apparatus of claim 1, wherein the hardware processor is further configured to generate a report based on the received response from the first user.

6. The apparatus of claim 1, wherein the hardware processor is further configured to send the response from the first user to a remote database.

7. The apparatus of claim 6, wherein the hardware processor is further configured to retrieve the response from the first user from the remote database.

8. A method comprising:
storing identifying information of a first user;
determining a first question to present to the first user, wherein the determined first question pertains to activity of the first user on a network;
determining an interval based on previous activity of the first user on the network, wherein:
the previous activity of the first user on the network does not indicate that the first user has engaged in activities on the network that are classified as undesirable; and
determining the interval for the first user comprises randomly generating the interval;
communicating to a device of the first user, based on the stored identifying information of the first user, the first question for the first user according to the determined interval for the first user, wherein in response to receiving the first question the device is configured to display a popup window presenting the first question to the first user; and
receiving, from the device of the first user, a response to the first question for the first user, wherein the response to the first question for the first user indicates that the first user has engaged in activities on the network that are classified as undesirable;
determining an adjusted interval for the first user based on the first user's response to the first question, wherein the adjusted interval is a set interval; and
subsequently communicating a second question to the first user according to the adjusted interval determined for the first user.

9. The method of claim 8, further comprising:
storing identifying information of a second user; and
determining a first question for the second user, wherein the first question for the second user pertains to activity of the second user on the network.

10. The method of claim 9, wherein the first question for the second user is different than the first question for the first user.

11. The method of claim 9, further comprising:
determining an interval for the second user based on previous activity of the second user on the network, wherein:
the previous activity of the second user on the network does not indicate that the second user has engaged in activities on the network that are classified as undesirable; and
determining the interval for the second user comprises randomly generating the interval for the second user;
communicating to a device of the second user, based on the stored identifying information of the second user, the first question for the second user according to the determined interval for the second user; and receiving, from the device of the second user, a response to the first question for the second user, wherein the response to the first question for the second user does not indicate that the second user has engaged in activities on the network that are classified as undesirable;
determining an adjusted interval for the second user based on the second user's response to the first question for the second user, wherein determining the adjusted interval for the second user comprises randomly generating the adjusted interval for the second user; and
subsequently communicating a second question for the second user to the device of the second user according to the adjusted interval determined for the second user.

12. The method of claim 8, further comprising generating a report based on the received response from the first user.

13. The method of claim 8, further comprising sending the response from the first user to a remote database.

14. The method of claim 13, further comprising retrieving the response from the first user from the remote database.

15. A system comprising:
a device of a first user comprising a display, the device configured to access a network;
a memory configured to store identifying information of a first user; and
a hardware processor communicatively coupled to the memory, the hardware processor configured to:
determine a first question to present to the first user, wherein the determined first question pertains to activity of the first user on the network;
determine an interval based on previous activity of the first user on the network, wherein:
the previous activity of the first user on the network does not indicate that the first user has engaged in activities on the network that are classified as undesirable; and
determining the interval for the first user comprises randomly generating the interval;
communicate to the device of the first user, based on the stored identifying information of the first user, the first question for the first user according to the determined interval, wherein in response to receiving the first question the device is configured to display a popup window presenting the first question to the first user; and
receive, from the device of the first user, a response to the first question for the first user, wherein the response to the first question for the first user indicates that the first user has engaged in activities on the network that are classified as undesirable;
determine an adjusted interval for the first user based on the first user's response to the first question, wherein the adjusted interval for the first user is a set interval; and
subsequently communicate a second question to the device of the first user according to the adjusted interval determined for the first user.

16. The system of claim 15, wherein:
the memory is further configured to store identifying information of a second user; and
the hardware processor is further configured to determine a first question for the second user, wherein the first question for the second user pertains to activity of the second user on the network.

17. The system of claim 16, wherein the first question for the second user is different than the first question for the first user.

18. The system of claim 16, further comprising a device of a second user configured to access the network, wherein the hardware processor is further configured to:
- determine an interval for the second user based on previous activity of the second user on the network, wherein:
  - the previous activity of the second user on the network does not indicate that the second user has engaged in activities on the network that are classified as undesirable; and
  - determining the interval for the second user comprises randomly generating the interval for the second user;
- communicate to a device of the second user, based on the stored identifying information of the second user, the first question for the second user according to the determined interval for the second user; and
- receive, from the device of the second user, a response to the first question for the second user, wherein the response to the first question for the second user does not indicate that the second user has engaged in activities on the network that are classified as undesirable;
- determine an adjusted interval for the second user based on the second user's response to the first question for the second user, wherein determining the adjusted interval for the second user comprises randomly generating the adjusted interval for the second user; and
- subsequently communicate a second question for the second user to the device of the second user according to the adjusted interval determined for the second user.

19. The system of claim 15, wherein the hardware processor is further configured to generate a report based on the received response from the first user.

20. The system of claim 15, wherein the hardware processor is further configured to send the response from the first user to a remote database.

\* \* \* \* \*